United States Patent
Ridgeway, Jr.

[11] Patent Number: 6,135,133
[45] Date of Patent: Oct. 24, 2000

[54] WATER-HEATER CONTAINMENT AND WARNING DEVICE

[76] Inventor: Louis Herbert Ridgeway, Jr., 1204 Empire Cir., Lawrenceville, Ga. 30044

[21] Appl. No.: 09/268,977

[22] Filed: Mar. 16, 1999

[51] Int. Cl.⁷ ............................ H01H 29/06; F16K 31/02; G08B 21/00
[52] U.S. Cl. ..................... 137/15.11; 122/504.2; 137/312; 137/392; 137/558; 220/571; 220/677; 220/690; 222/108; 340/605; 340/620
[58] Field of Search ...................... 137/312, 315, 137/387, 558, 15.08, 15.11, 392; 122/504, 504.2, 507; 126/361, 363; 320/4.07, 4.08, 4.21, 4.23, 4.25; 220/571, 677, 690; 340/604, 605, 620; 222/108

[56] References Cited

U.S. PATENT DOCUMENTS

| | | | |
|---|---|---|---|
| 384,118 | 6/1888 | Bellinger | 220/690 |
| 1,557,066 | 10/1925 | Krantz | 220/690 |
| 3,145,904 | 8/1964 | Bromley | 220/677 |
| 4,814,752 | 3/1989 | Lehman | 340/616 |
| 4,903,723 | 2/1990 | Sublett | 137/312 |
| 4,944,253 | 7/1990 | Bellofatto | 122/504.2 |
| 5,188,143 | 2/1993 | Krebs | 137/312 |
| 5,218,838 | 6/1993 | Kitamoto et al. | 62/288 |
| 5,345,224 | 9/1994 | Brown | 340/605 |
| 5,357,241 | 10/1994 | Welch, Jr. et al. | 340/605 |
| 5,368,263 | 11/1994 | Harrison | 248/146 |
| 5,493,877 | 2/1996 | Wickremasinghe | 68/208 |
| 5,632,302 | 5/1997 | Leonoir, Jr. | 137/312 |
| 5,877,689 | 3/1999 | D'Amico | 137/312 |
| 5,881,762 | 3/1999 | Janesky | 122/504.2 |
| 5,883,300 | 3/1999 | Johnson | 137/312 |
| 5,918,591 | 7/1999 | Vollmar et al. | 126/363 |

*Primary Examiner*—George L. Walton
*Attorney, Agent, or Firm*—Henri J. A. Charmasson; John D. Buchaca

[57] ABSTRACT

A household appliance water leak detection and management containment wall made from one or more oblong pieces of water-resistant, shape-retaining, flexible sheet material such as aluminum. The ends of the pieces may be joined to circumscribe a zone of contact between the appliance and its supporting surface, forming a containment space. A layer of sealant creates a water-resistant seal between a lower edge of the wall and the supporting surface. An electronic water-detection and alarm device may be placed within the containment space. A valved spigot may be mounted through a portion of the wall to allow drainage.

18 Claims, 3 Drawing Sheets

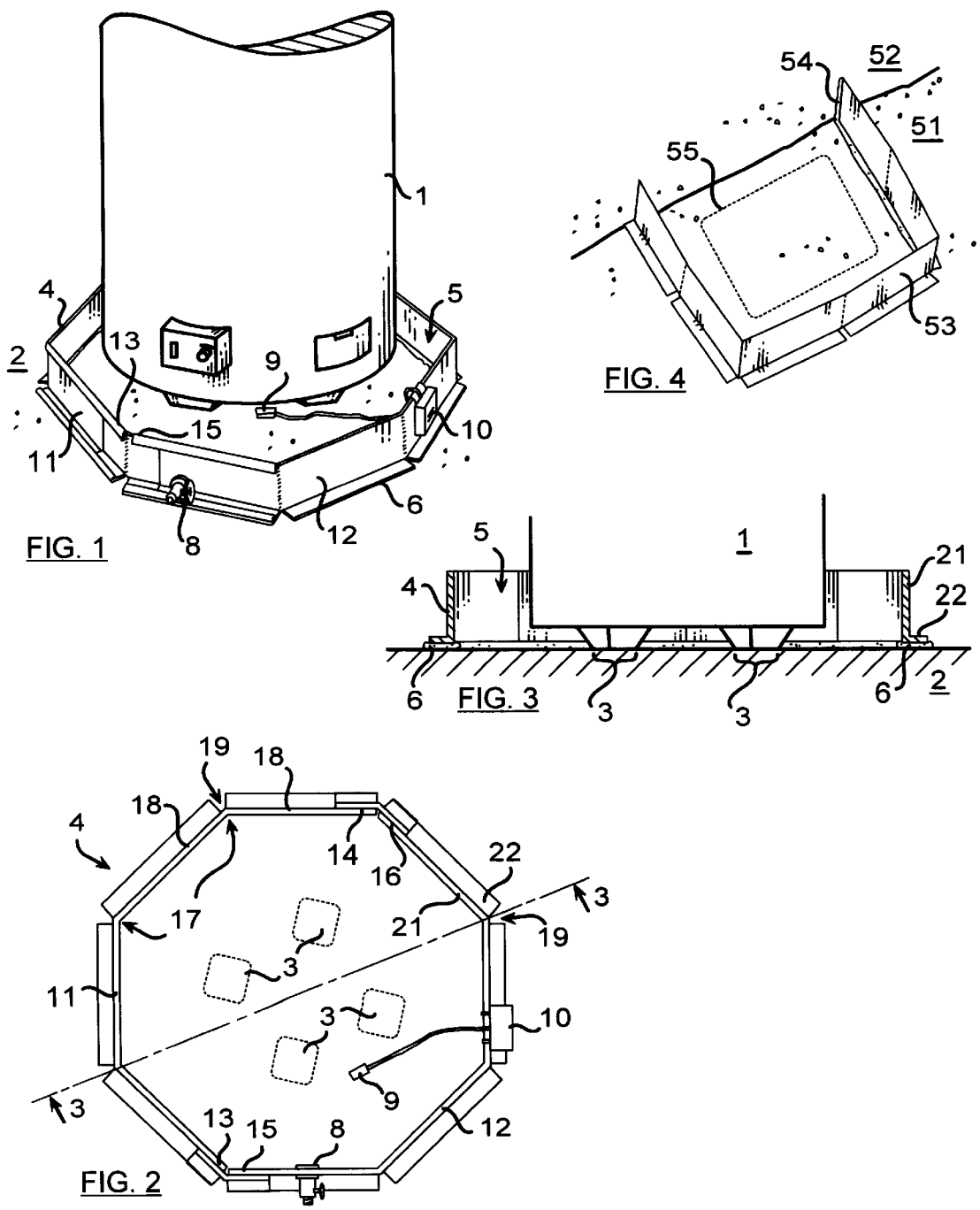

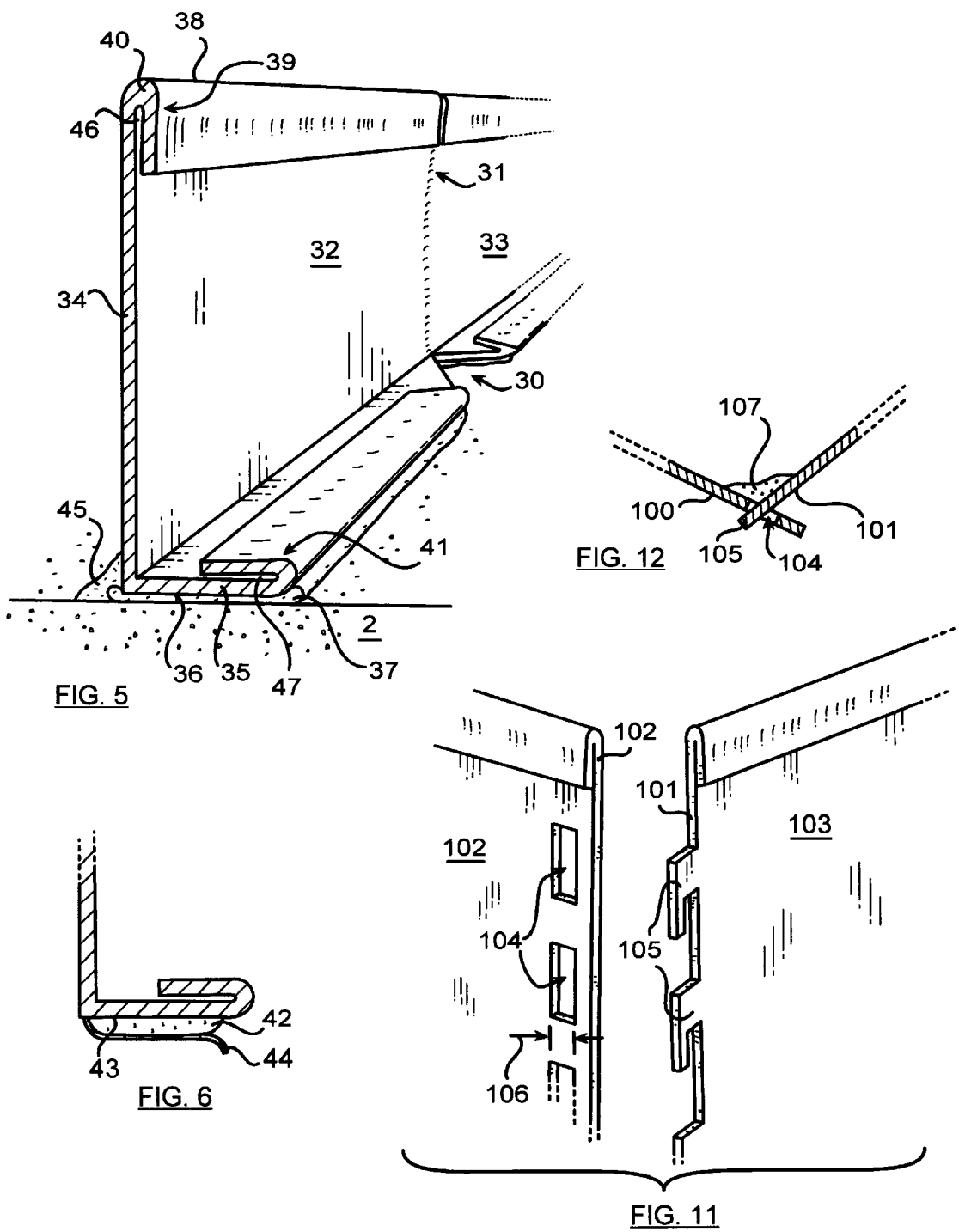

WATER-HEATER CONTAINMENT AND WARNING DEVICE

FIELD OF THE INVENTION

This invention relates to household water management systems and more particularly to devices for managing water leaks in household appliances such water heaters.

BACKGROUND OF THE INVENTION

Many household appliances such as water heaters and clothes or dishwashers are supplied directed through household plumbing and automatically control the amount of water they use. When these devices develop leaks, the result can be catastrophic.

This is particularly true for water heaters which typically use large continuously filled cylindrical tanks of 40–50 gallons or more. When those tanks fail flooding usually results.

Several devices and systems have been developed to avoid flooding by providing water-type catch pans which locally contain an amount of leaking water as shown in Brown U.S. Pat. No. 5,345,224. These systems also employ electronic water detection devices which usually actuate an audible alarm indicating a leak before the water has had a chance to spill over the pan, or by regulating the inflow of water from household plumbing.

A disadvantage of pan-based containment is that during installation, the water heater must typically be lifted off the floor to allow the pan to be slipped underneath. The water heater must usually be drained completely to reduce its weight to allow lifting. This process wastes water and the energy to heat it in addition to the time of the installer.

A second disadvantage of previous systems is that the size and shape of the pan is substantially unalterable. Since water heaters and other appliances come in different sizes and shapes and are often installed in small spaces with restricted access, movement of the appliance may be restricted. Also, there may not be room enough for the pan. Existing features such as water or gas lines, walls or foundations may interfere with portions of a specifically shaped pan. Providing numerous different sized and shaped pans for every type of space would be economically impractical and nearly impossible.

Therefore, there is a need for an inexpensive, easily installed leak management and detection device which does not suffer from the above-disadvantages.

SUMMARY OF THE INVENTION

The principal and secondary objects of this invention are to provide a household appliance water leak detection and management device which is inexpensive, easily installed and readily configurable to a variety of spaces and appliances.

These and other valuable objects are achieved by a containment wall made from one or more oblong pieces of water-resistant, shape-retaining, flexible sheet material such as aluminum. The ends of the pieces may be joined to circumscribe a zone of contact between the appliance and its supporting surface, thereby forming a containment space. A layer of sealant creates a water-resistant seal between a lower edge of the wall and the supporting surface. An electronic water-detection device may be placed within the containment space. A valved spigot may be mounted through a port-ion of the wall to allow drainage.

BRIEF DESCRIPTION OF THE DRAWING

FIG. 1 is a perspective view of the leak managing containment wall emplaced about a household water heater;

FIG. 2 is a plan view of the containment wall of FIG. 1 with the water heater removed;

FIG. 3 is a cross-sectional side view of the containment wall of FIG. 2 taken along line 3—3 with water heater added;

FIG. 4 is a perspective view of a containment wall substantially circumscribing a containment area at the corner of a floor and wall;

FIG. 5 is a cross-sectional perspective view of a portion of the containment wall sealed to a floor;

FIG. 6 is a cross-sectional side view of the bottom edge of a containment wall showing the peal-away protective layer on an amount of sealant;

FIG. 11 is a perspective view of another alternate means for connecting adjacent ends of containment wall pieces; and FIG. 12 is a cross-sectional top view thereof.

DESCRIPTION OF THE PREFERRED EMBODIMENT OF THE INVENTION

Figure 7:
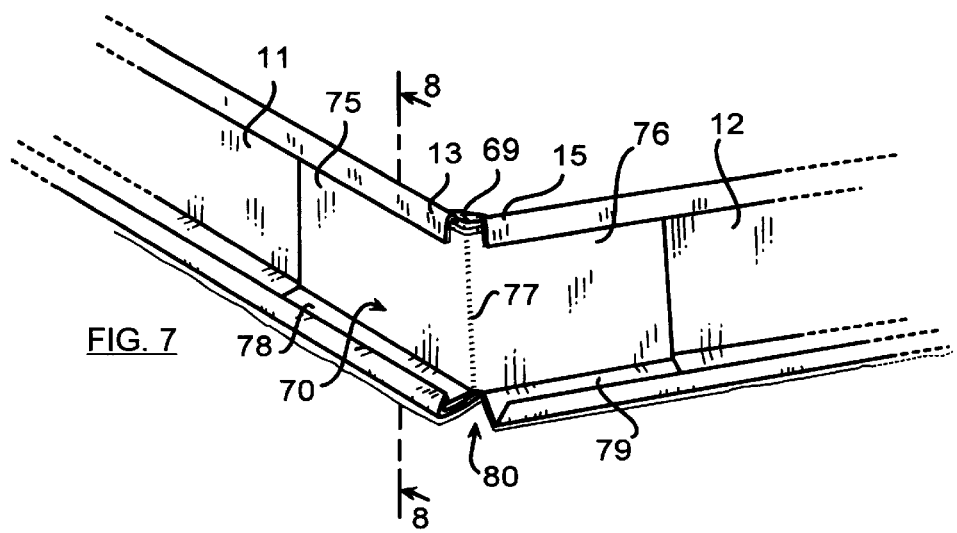
FIG. 7 is a perspective view of the adjoinment for connecting adjacent ends of containment wall pieces.

Referring now to the drawing, there is shown in FIGS. 1–3, the lower portion of a water heater 1 mounted upon a supporting surface 2 such as a concrete floor. The water heater contacts the supporting surface within one or more zones of contact 3. A barrier or containment wall 4 substantially circumscribes the zones of contact to form a water resistant containment space 5. The wall contacts the floor along a substantially circumscribing interface. A water-resistant seal 6 is formed between the lower edge 7 of the wall and the floor. A valved aperture 8 through the wall may be formed to allow for controlled drainage. The valve may be in the shape of a spigot allowing the connection of a garden hose. A water detection sensor 9 is placed within the containment space, for example, beneath the water heater, and electronically connected to an audible alarm device 10.

The term "substantially circumscribing" is meant to include both ring-like structures as shown in FIGS. 1–2, and those structures as shown in FIG. 4 which form a containment space with existing structures such as at the corner of the floor 51 and a concrete room curb or wall 52 to which the containment wall 53 adheres and forms a water resistant seal 54 around the zone of contact 55.

As shown in FIGS. 1–3, the containment wall 4 is formed from one or more oblong pieces 11,12 of water-resistant sheet material. The sheet material is preferably flexible, shape-retaining, corrosion-resistant material such as aluminum, galvanized steel or various plastics such as polyvinyl chloride (PVC) or acrylonitrile-butadiene-styrene (ABS). The ends 13,14 of one piece 11 are capable of being connected to each other or the corresponding ends 15,16 of the other piece 12 or pieces. These connections must be capable of being made water-resistant. Various means for connecting the ends will be described further below.

In the preferred approach, the containment wall 4 is formed by two articulated pieces 11,12 creating a generally polygonal top view. Each articulated piece is formed from a single sheet of material which has been vertically scored along one or both sides from top to bottom at medial positions to provide for predetermined joints or bending points 17, to form two or more substantially planar panels 18 joined end-to-end at the scorings. Each panel therefore forms one of the straight sides of the polygon.

Each panel has a general L-shaped cross-section with the vertical portion 21 forming the retaining wall and the horizontal portion extending orthogonally outward from the bottom edge of the vertical portion to form a foot 22. The foot acts as a base keeping the retaining wall portion vertical, and provides a bottom surface for an amount of sealant 6 for contacting the floor 2. A notch 19 exists through the foot next to each of the scorings to allow bending between panels.

As shown in FIG. 5, a notch 30 may be angled or otherwise widened to allow for hyperextension of the joint 31 between panels 32,33. As stated above, the generally L-shaped cross-section of the panels provides a vertical retaining wall portion 34 and a horizontal foot portion 35 having a substantially flat bottom surface 36 for carrying an amount of sealant 37 for contacting the floor 2. The amount of sealant should be generous enough fill pock marks commonly found in concrete floors. Such an amount will likely squish out beyond the edges of the foot when the containment wall is firmly pressed against the floor. The sealant is preferably aluminum butyl sealant such as RV10121-1 available from Ruvan, Inc. of Evansville, Ind. After installation, an additional bead 45 of sealant may be placed along either or both sides of the contact between the containment wall and floor.

The upper edge 38 of the vertical retaining wall portion 34 terminates in a fold 39 of the sheet material back upon itself to provide a dull upper lip 40 to prevent accidental cutting injuries and to create a wall channel 46 to facilitate connection with an adjacent wall. Similarly, the outer edge of the foot 35 may have a similar protective fold 41 creating a similar foot channel 47.

As shown in FIG. 6, the sealant layer 42 is preferably preattached to the bottom surface 43 of the foot and covered by a protective covering strip 44 of wax paper or plastic to be removed prior to placement on the supporting surface.

Figure 8:
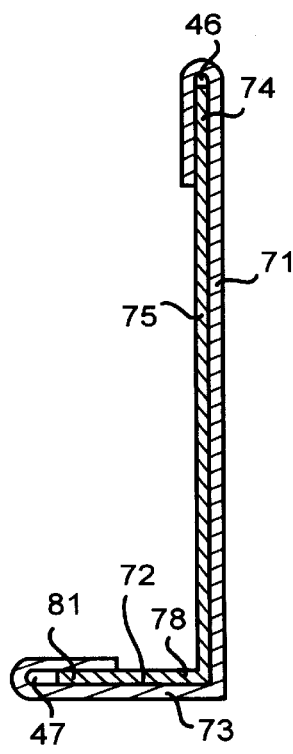
FIG. 8 is a cross-sectional side view thereof taken along line 8—8.

Referring to FIGS. 7–8, the two adjacent ends 13,15 of the pieces 11,12 are connectable to one another via an adjoinment 70 sized and shaped to engage the channels 46, 47 and straddle the outer sides of the vertical retaining wall portions 71 atop the top surface 72 of the foot portions of both adjacent pieces 73. Each adjoinment comprises two adjacent vertical panes 75,76 connected at an angle along a scored vertical joint 77. Each pane has an orthogonally outward extending foot 78,79. A notch 80 allows free bending at the joint. The upper end 74 of each pane 75, 76 has a width commensurate with the width of wall channel 46, Similarly, the outer end 81 of each adjoinment foot 78, 79 has a width allowing insertion into foot channel 47, to allow endwise insertion of the adjoinment. Once connected, a vertical bead 69 of sealant may be used to create the water-resistant seal between the pieces.

Figure 9:
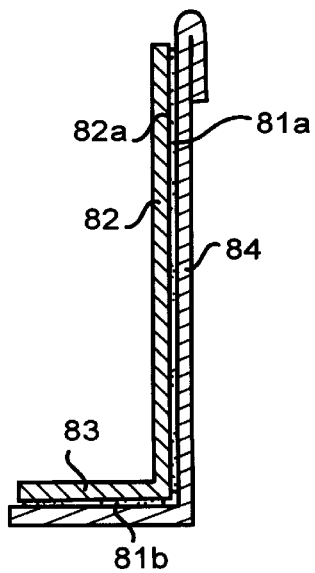
FIG. 9 is a cross-sectional side view showing an alternate means for attaching the adjoinment to the containment wall.

Means for securing the adjoinment to both pieces are provided. In a first embodiment, friction between the folds 39, 41 and the adjoinment ends 74, 81 maintains a secure connection. In an alternate embodiment shown in FIG. 9, a layer of adhesive 81a is placed on the inner surface 82a of an adjoinment pane 82 which contacts the outer side of a corresponding panel 84. Optionally, a second layer of adhesive 81b secures the adjoinment foot 83 to the top surface of the corresponding foot of the piece.

Figure 10:
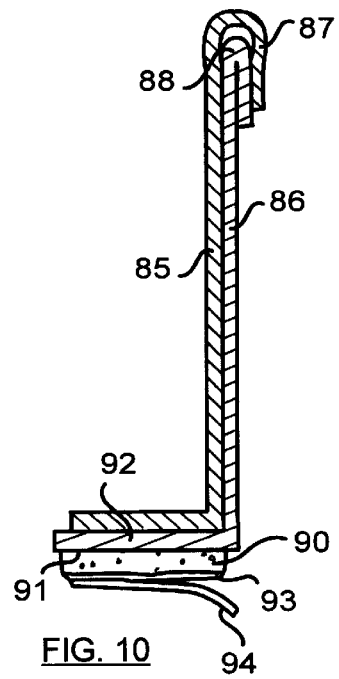
FIG. 10 is a cross-sectional side view showing another alternate means for attaching the adjoinment to the containment wall.

As shown in FIG. 10 in an alternate embodiment, the adjoinment 85 attaches to each panel 86 via a snap clip 87 sized and positioned to clip over the folded upper lip 88 of the panel proximate to its end.

FIG. 10 also shows alternate means for adhering the wall to the floor through a layer of foam padding 90 connected to the lower face 91 of the horizontally extending foot 92. The padding is made from deformable foam material, such as polyurethane foam, allowing conformance to uneven features on the surface of the floor. A layer of adhesive 93 coats the bottom surface of the foam layer. A pealable protective wax paper layer 94 covers the adhesive layer until the containment wall is installed. Once the wall is installed, a bead of sealant may be applied along one or both of the edges of the contacting foot. The bead of sealant allows open cell foam padding to be used.

FIGS. 11–12 show alternate means for connecting the compatible ends 100,101 of pieces 102,103. A first end 100 has a series of vertically oblong slots 104 formed through the wall proximate to the end. Corresponding hooked projections 105 extend from the end 101 of the second piece 103. The projections are sized and located to engage through the slots and thereby connect the ends. The width 106 and shape of the slots may be selected to allow for a range of angular positioning between the pieces. As in the previous embodiment of the end-connecting means, once the pieces have been positioned, a small bead 107 of sealant may be placed along the inside junction formed between connected ends to create a water-resistant seal between the pieces.

The general structure of the containment wall may be inexpensively manufactured through techniques well known in the plastic and metal-working arts. The aluminum or steel containment wall may be formed through a cold rolling and perforation process. The drainage spigot and water sensing alarm may be attached by hand prior to packaging. Alternatively, these components may be sold disassembled in kit form. Automated techniques may be used to apply the sealant layer and its protective covering. Alternatively, a tube of silicon type sealant may be provided along with the kit.

While the preferred embodiments of the invention have been described, modifications can be made and other embodiments may be devised without departing from the spirit of the invention and the scope of the appended claims.

What is claimed is:

1. An enclosure apparatus disposed about a household appliance for detecting any water leaks from the household appliance mounted or resting on a support surface, said apparatus comprises:

a wall of water-resistant material having first and second ends and a bottom edge;

said wall having a plurality of substantially planar connected panels;

an adjacent pair of said panels being connected at a joint which allows bath flection and hyperextension to allow said wall to accommodate various appliance locations;

said wall being adapted for substantially circumscribing a zone of contact between said appliance and said surface;

said bottom edge being shaped to intimately contact said surface;

an amount of sealant sufficient to form a water-resistant seal between said bottom edge and said surface.

2. The apparatus of claim 1, wherein said first and second ends are adapted to connect to one another.

3. The apparatus of claim 1, which further comprises means for connecting together said first and second ends.

4. The apparatus of claim 3, wherein said means for connecting comprise an adjoinment having a first portion securable to said wall proximate to said first end and a second portion securable to said wall proximate to said second end.

5. The apparatus of claim 4, which further comprises said wall having a top portion terminating at an upper fold thereby forming a dull exposed upper lip.

6. The apparatus of claim 5, wherein said fold forms a channel having a width commensurate with the thickness of an upper end portion of said adjoinment.

7. The apparatus of claim 1, which further comprises a water-sensing unit electronically tied to an audible alarm.

8. The apparatus of claim 1, which further comprises a closable aperture extending through a portion of said wall.

9. The apparatus of claim 8, wherein said closable aperture comprises a threaded spigot.

10. The apparatus of claim 1, wherein a first grouping of said panels are formed side-to-side from a single sheet of said water-resistant material.

11. The apparatus of claim 1, wherein each of said panels comprises:

a lower edge;

first and second opposite side edges;

means for interconnecting a first side edge of a first panel to a second side edge of a second panel.

12. The apparatus of claim 1, which further comprises a foot extending outwardly and substantially orthogonally from said bottom edge.

13. The apparatus of claim 12, which further comprises a layer of deformable foam padding formed along a lower face of said foot.

14. A method for assembling an enclosure apparatus disposed about a household appliance for detecting any water leaks from the household appliance contacting a support surface along a zone of contact, said method comprises:

providing said enclosure apparatus to form a water-resistant barrier on said support surface circumscribing said zone;

wherein said barrier comprises an articulated wall having at least one pair of panels connected at a joint which allows both flection and hyperextension to allow said barrier to accommodate various appliance locations; and providing a seal that circumscribes an interface between said wall and said support surface.

15. The method of claim 14, wherein said providing said enclosure apparatus comprises:

securing together ends of said wall; and creating a water-resistant seal between said ends.

16. The method of claim 14, wherein said providing a seal comprises firmly pressing said wall against said supporting surface upon a layer of sealant.

17. The method of claim 14, wherein said providing said enclosure apparatus comprises deforming said wall at a predetermined bending point.

18. An enclosure apparatus disposed about a household appliance for detecting any water leaks from the household appliance contacting a support surface along a zone of contact, said apparatus comprises:

a wall of water-resistant material having at least one pair panels connected at a joint which allows both flection and hyperextension to allow said apparatus to accommodate various appliance locations; and a water-resistant seal between said wall and said support surface.

* * * * *